US011286010B2

(12) United States Patent
Williams et al.

(10) Patent No.: US 11,286,010 B2
(45) Date of Patent: Mar. 29, 2022

(54) MECHANISMS AND METHODS TO PREVENT DEBRIS FROM ENTERING A VEHICLE CABIN

(71) Applicant: Toyota Motor Engineering & Manufacturing North America, Inc., Plano, TX (US)

(72) Inventors: Paxton S. Williams, Milan, MI (US); Scott Louis Frederick, Brighton, MI (US); Colby Steven Williams, Milan, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 278 days.

(21) Appl. No.: 16/718,441

(22) Filed: Dec. 18, 2019

(65) Prior Publication Data
US 2021/0188371 A1      Jun. 24, 2021

(51) Int. Cl.
*B62D 35/00*      (2006.01)
*B62D 33/00*      (2006.01)

(52) U.S. Cl.
CPC .......... *B62D 35/001* (2013.01); *B62D 33/00* (2013.01)

(58) Field of Classification Search
CPC ....... B62D 35/00; B62D 35/001; B62D 33/00
See application file for complete search history.

(56) References Cited

U.S. PATENT DOCUMENTS

| | | | | |
|---|---|---|---|---|
| 3,276,811 A | * | 10/1966 | Schmidt | B62D 35/007 296/91 |
| 3,696,732 A | * | 10/1972 | Rodgers | B62D 33/06 296/91 |
| 4,460,055 A | * | 7/1984 | Steiner | B62D 35/00 180/7.1 |
| 6,224,135 B1 | * | 5/2001 | Rehkopf | B60J 1/20 296/91 |
| 7,216,923 B2 | | 5/2007 | Wong et al. | |
| 7,712,821 B2 | * | 5/2010 | Moscoso Gomez | B62D 35/001 296/180.1 |
| 9,371,098 B2 | | 6/2016 | Yamaguchi et al. | |
| 2012/0080904 A1 | | 4/2012 | Pursley | |

OTHER PUBLICATIONS

"GMC Pickups 101: Busting Myths of Truck Aerodynamics", https://media.gmc.com/media/us/en/gmc/news.detail.html/content/Pages/news/us/en/2013/May/0516-gmc-pickup-aero.html, May 16, 2013.

(Continued)

*Primary Examiner* — Lori L Lyjak
(74) *Attorney, Agent, or Firm* — Christopher G. Darrow; Darrow Mustafa PC

(57) ABSTRACT

A pickup truck includes a cab having a rear wall and a rear window positioned in the rear wall. An airflow duct extends along a portion of the cab. The airflow duct has an inlet and an outlet and defines an airflow passage extending between the inlet and the outlet. The outlet is positioned rearwardly of the cab and within a space defined by a first horizontal plane extending through an edge of the rear window and a second horizontal plane spaced apart a predetermined distance from the first horizontal plane in a direction away from the rear window.

8 Claims, 3 Drawing Sheets

(56) References Cited

OTHER PUBLICATIONS

"Trucks and SUVs Get Slippery—A New Focus on Aerodynamics Aims to Make Big Vehicles Less of a Drag" to Goreham et al, http://bestride.com/news/trucks-and-suvs-get-slippery-a-new-focus-on-aerodynamics-aims-to-make-big-vehicles-less-of-a-drag, 2017.
"2014 GMC Sierra Regular Cab Revealed!" to Arbogast et al, https://www.davearbogast.com/2014-gmc-sierra-regular-cab-revealed/, May 23, 2013.
"Equipment Spotlight: Aero Add-ons Smooth Airflow, Boost Fuel Economy" to Smallwood et al, https://www.overdriveonline.com/aero-add-ons-smooth-airflow-boost-fuel-economy/, Feb. 4, 2015.

* cited by examiner

MECHANISMS AND METHODS TO PREVENT DEBRIS FROM ENTERING A VEHICLE CABIN

TECHNICAL FIELD

The present invention relates to mechanisms and methods structured to prevent debris from entering a cabin or passenger compartment of a vehicle and, more particularly, to an airflow duct for directing an airflow into a flow path of debris into the cabin, to prevent the debris from entering the cabin.

BACKGROUND

A vehicle such as a pickup truck may have an uncovered cargo bed and a rear window in a cab of the pickup which may be opened by a user while driving. While the vehicle is moving, one or more airstreams (or portions of airstreams) may flow over the top or roof of the cab, then downwardly toward the cargo bed floor to be redirected upwardly, creating a vortex or "swirling" effect within the cargo bed. This vortex may pick up leaves and other debris from the cargo bed and force the debris through an open rear window of the cab. In addition, fluctuating pressure differentials between the air inside the cab and the air immediately behind the cab may cause debris entrained in an airstream flowing around the vehicle to enter the open rear cab window.

SUMMARY

In one aspect of the embodiments described herein, a pickup truck includes a cab having a rear wall and a rear window positioned in the rear wall. An airflow duct extends along a portion of the cab. The airflow duct has an inlet and an outlet and defines an airflow passage extending between the inlet and the outlet. The outlet is positioned rearwardly of the cab and within a space defined by a first horizontal plane extending through an edge of the rear window and a second horizontal plane spaced apart a predetermined distance from the first horizontal plane in a direction away from the rear window.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

Figure 1A:
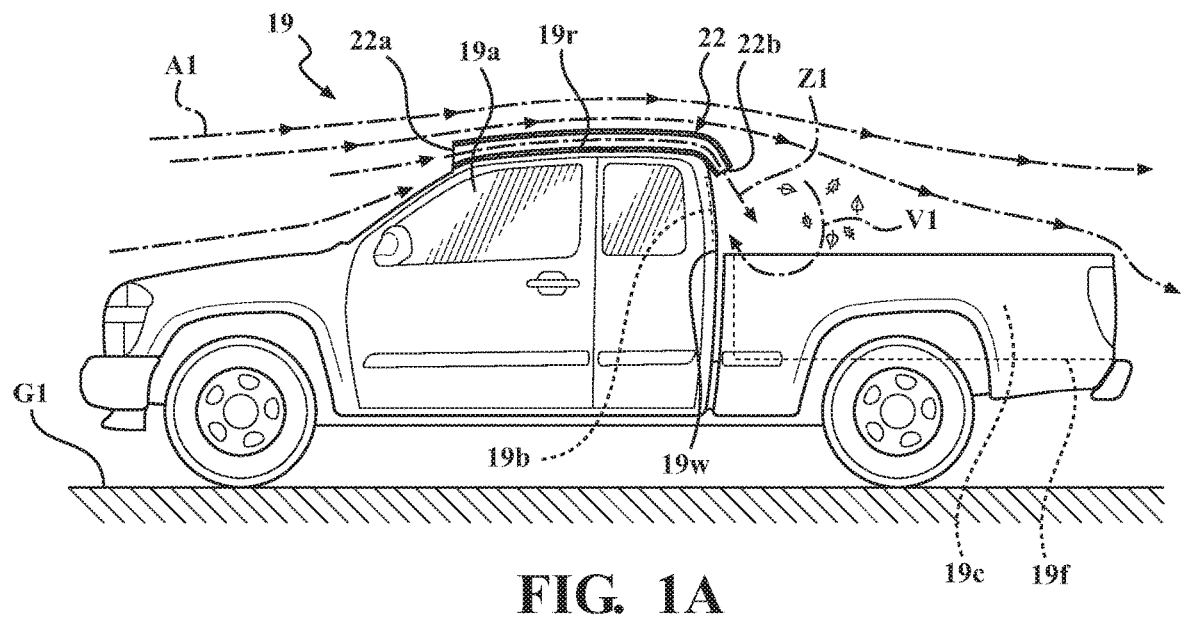
FIG. 1A is a schematic side view of a pickup truck incorporating an airflow duct in accordance with an embodiment described herein, structured for directing an air stream into a space behind a cab of the pickup truck.

Embodiments described herein relate to a pickup truck including a cab having a rear wall and a rear window positioned in the rear wall. An airflow duct extends along a portion of the cab. The airflow duct has an inlet and an outlet and defines an airflow passage extending between the inlet and the outlet. The outlet is positioned rearwardly of the cab and within a space defined by a first horizontal plane extending through an edge of the rear window and a second horizontal plane spaced apart a predetermined distance from the first horizontal plane in a direction away from the rear window. The airflow duct may be mounted along a top or roof of the cab, or the duct may extend along an underside of the cab. An outlet of the airflow duct may direct an airstream into a region of space located between the cab rear window and one or more airstreams flowing around the cab and/or in the cargo bed. This outlet airstream may block or interdict the other airstreams flowing toward the rear window and carrying debris. In this manner, the debris may be prevented from entering the cab through the open rear window.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments. Any of the components described herein may be formed from a material (or materials) suitable for the purpose(s) of the element as described herein.

Figure 1B:
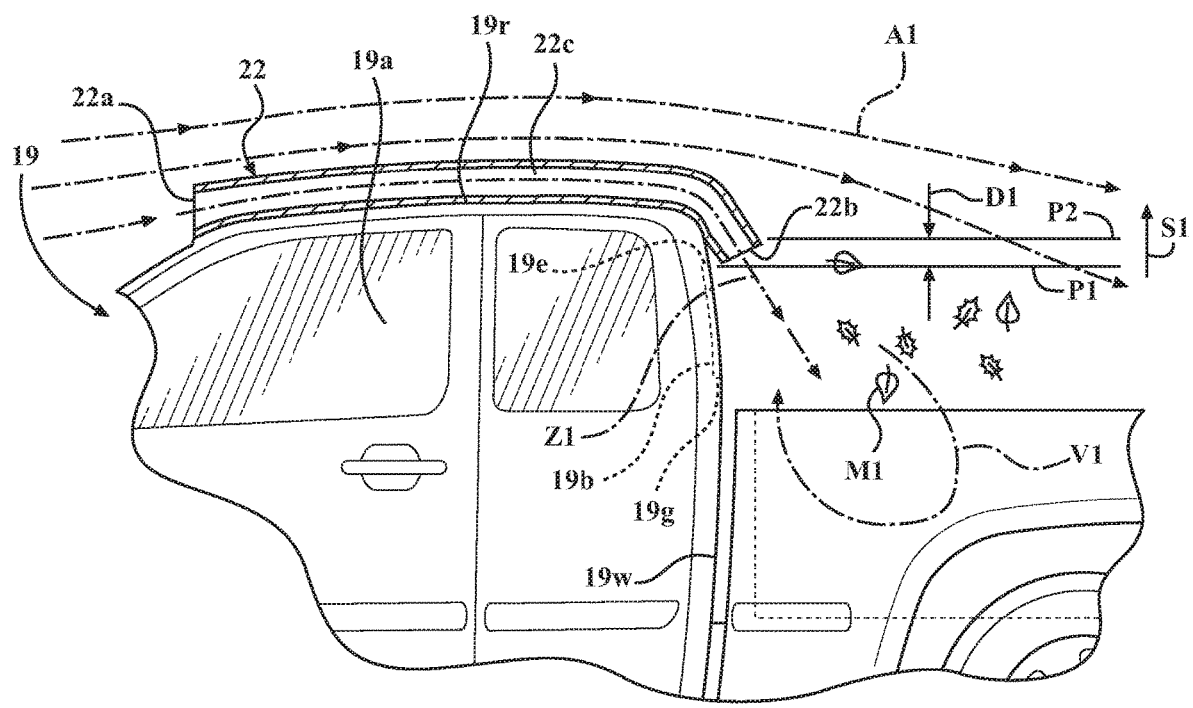
FIG. 1B is a magnified view of a portion of the schematic side view shown in FIG. 1A.

FIG. 1A is a schematic side view of a pickup truck 19 incorporating an airflow duct 22 structured for directing an air stream into a space behind a cab 19a of the pickup truck 19, to prevent a flow of debris into the cab 19a through an open rear window 19b of the cab. FIG. 1B is a magnified view of a portion of the schematic side view shown in FIG. 1A. In one or more arrangements, the pickup truck 19 may include the cab 19a, which may have a rear wall 19w and the rear window 19b may be positioned in the rear wall 19w. The rear window 19b may be a window enabling a view into a cargo bed 19c of the truck 19 from inside the cab 19a, and may be operable to an open condition of the window 19b and a closed condition of the window.

As seen in FIGS. 1A and 1B, while the vehicle 19 is moving, one or more airstreams (or portions of airstreams) (generally and collectively designated A1) flowing over the top or roof 19r of the cab 19a may flow downwardly toward the cargo bed floor 19f and be redirected upwardly, creating a vortex V1 or "swirling" effect within the cargo bed 19c. This vortex V1 may pick up leaves and other debris M1 from the cargo bed 19c and force the debris through an open rear window 19b of the cab 19a. In addition, fluctuating pressure differentials between the air inside the cab 19a and the air immediately behind the cab may cause debris M1 entrained in an airstream flowing around the vehicle 19 to enter the open rear cab window 19b.

In one or more arrangements, to aid in preventing entry of debris M1 through the cab rear window 19b, an airflow duct 22 may be provided extending along a portion of the cab 19a. The airflow duct 22 may have an inlet 22a, an outlet 22b, and an airflow passage 22c extending between the inlet 22a and the outlet 22b. As the truck moves forward, air enters the inlet 22a and flows along the airflow passage 22c to the outlet 22b where it is discharged as airstream Z1 as described herein. The outlet 22b may be positioned rearwardly of the cab 19a and within a space defined by a first horizontal plane P1 extending through an edge 19e of the rear window and a second horizontal plane P2 spaced apart a predetermined distance D1 from the first horizontal plane P1 in a direction S1 away from the rear window 19b. The edge 19e of the rear window through which the plane P1 passes may be defined by a line or boundary where the rear window 19b enters the cab rear wall 19w, or along which the rear window 19b is otherwise attached or mounted to the rear wall 19w. In the embodiment shown in FIGS. 1A and 1B, the edge 19e of the rear window 19b is an uppermost edge of the rear window 19b.

As used herein, "rearwardly" means in a direction toward a rear of the vehicle 19 from a given reference location. For example, positioning of the outlet 22b rearwardly of the cab 19a means that the outlet 22b is positioned behind the cab 19a (i.e., toward a rear of the vehicle with respect to the cab 19a). The duct outlet location may be specified so that an air stream Z1 exiting the outlet 22b will be interposed between the rear window 19b and one or more other airstreams A1 flowing around the truck 19 and/or within the cargo bed. Thus, the airstream Z1 flowing from the outlet 22b may function as a barrier between the rear window 19b and other airstreams A1 and associated debris M1 flowing around the vehicle 19 close to the rear window 19b. This barrier may prevent debris M1 from entering an open rear window 19b. For example, debris M1 that may otherwise be blown through the open rear cab window 19b may instead become entrained in the airstream Z1 exiting the outlet, thereby being guided away from the rear window 19b. For this purpose, the outlet 22b may be located in close proximity to the rear window 19b to help ensure that an airstream Z1 exiting the outlet 22b is interposed between the rear window 19b and other airstreams A1 flowing around the vehicle 19, and between the rear window 19b and other airstreams (such as vortex V1) branching off of or resulting from airstreams A1 flowing around the vehicle 19. Positioning the outlet 22b in a region of space between the planes P1 and P2 as described aids in ensuring that the outlet 22b is positioned close to the rear window 19b, while also minimizing obstruction of the view through the rear window 19b by the duct 22 and its outlet 22b.

In one or more arrangements, the entire outlet 22b may be positioned between the planes P1 and P2. In one or more arrangements, and as seen in FIGS. 1A and 1B, the plane P1 may extend through an uppermost edge 19e of the rear window 19b as defined by a line where the rear window enters the cab rear wall 19w, or along which the rear window 19b is otherwise attached or mounted to the rear wall 19w. Also as seen in FIG. 1B, for an embodiment in which the duct extends along a top portion or roof of the cab, the plane P2 may be spaced a distance D1 above the plane P1.

In the embodiment shown in FIGS. 1A and 1B, at least a portion of the duct 22 extends along a top portion or roof 19r of the cab. The duct 22 may be embedded in the roof structure, or the duct 22 may be formed separately from the cab 19a and attached to the roof structure 19r using any suitable attachment method. In the embodiment shown in FIGS. 1A and 1B, the outlet 22b is also structured so that an air stream Z1 exiting the outlet 22b is directed rearwardly from the outlet. In the embodiment shown in FIGS. 1A and 1B, the outlet 22b is also structured so that the air stream Z1 exiting the outlet 22b is directed downwardly of the outlet 22b. As used herein, "downwardly" means in a downward direction (for example, toward a ground surface G1 supporting the vehicle 19) from a given reference location.

Figure 2A:
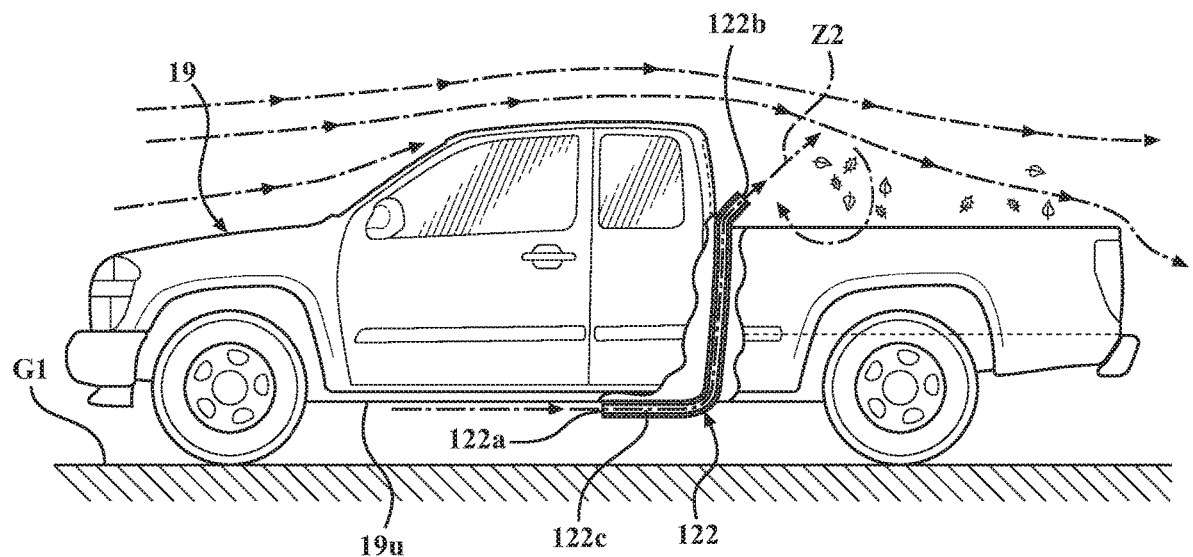
FIG. 2A is a schematic side view of a pickup truck incorporating an airflow duct in accordance with another embodiment described herein, structured for directing an air stream into a space behind a cab of the pickup truck.
Figure 2B:
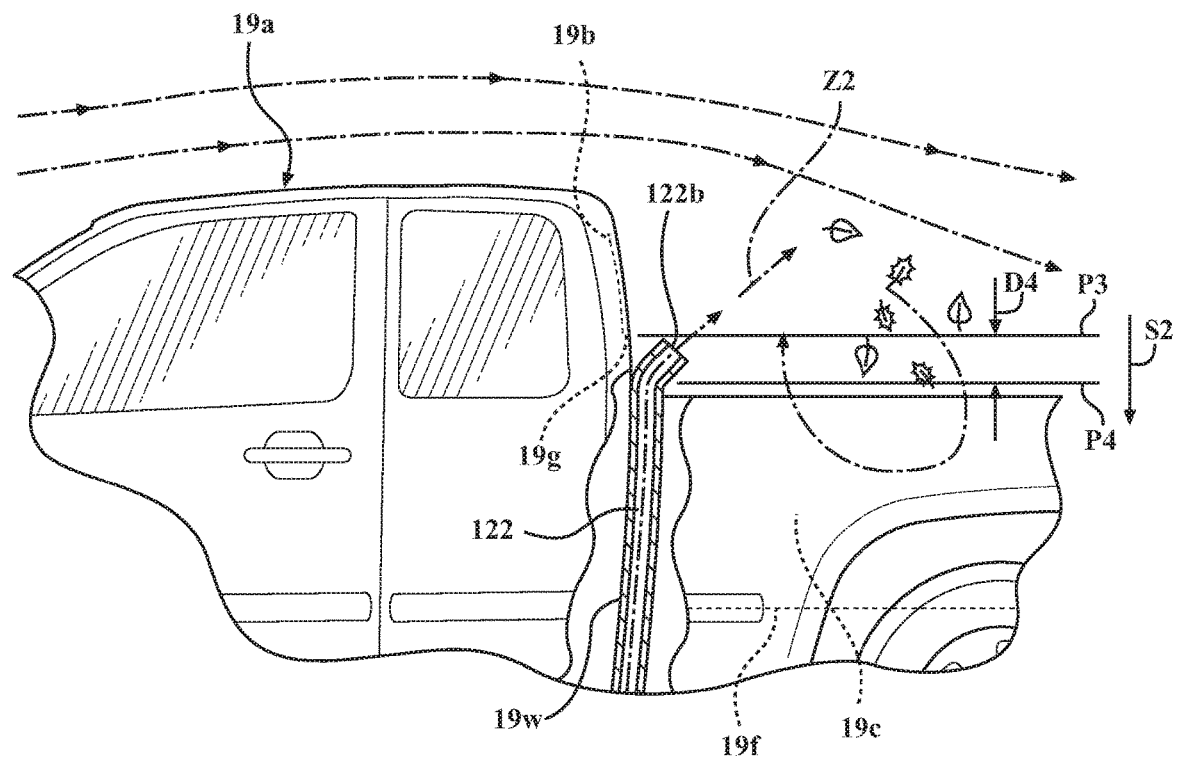
FIG. 2B is a magnified view of a portion of the schematic side view shown in FIG. 2A.

FIG. 2A is a schematic side view of a pickup truck incorporating an airflow duct 122 in accordance with another embodiment described herein, structured for directing an air stream Z2 into a space behind the cab 19a of the pickup truck 19. FIG. 2B is a magnified view of a portion of the schematic side view shown in FIG. 2A. Referring to FIGS. 2A and 2B, in one or more arrangements, the airflow duct 122 may have an inlet 122a, an outlet 122b, and an airflow passage 122c extending between the inlet 122a and the outlet 122b. At least a portion of the duct 122 may extend along an underside 19u of the cab 19a. The duct inlet 122a may be positioned near the front of the cab 19a or, as shown in FIGS. 2A, the inlet 122a may recessed or spaced rearwardly of the front of the cab 19a. The duct 122a may be routed from the underside 19u of the cab 19a between the cab and the cargo bed 19c so as to enable positioning of the outlet 122b proximate a lowermost edge 19g of the rear window 19b.

As previously described with respect to the embodiment having the duct 22 extending along a portion of the cab roof 19r, the outlet 122b may be positioned rearwardly of the cab 19a and within a space defined by a first horizontal plane P3 extending through an edge of the rear window 19b and a second horizontal plane P4 spaced apart a predetermined distance D4 from the first horizontal plane P3 in a direction S2 away from the rear window 19b. As seen in FIGS. 2A and 2B, the edge of the rear window 19b may be the lowermost edge 19g of the rear window 19b as defined by a line where the rear window 19b enters the cab rear wall 19w, or along which the rear window 19b is otherwise attached or mounted to the rear wall 19w. Also as seen in FIG. 2B, the plane P4 may be spaced a distance D4 below the plane P3. In this embodiment, the duct outlet 122b may be structured so that an air stream Z2 exiting the outlet 122b is directed both rearwardly and upwardly of the outlet. As used herein, "upwardly" means in an upward direction (for example, away from a ground surface G1 supporting the vehicle) from a given reference location.

Figure 3:
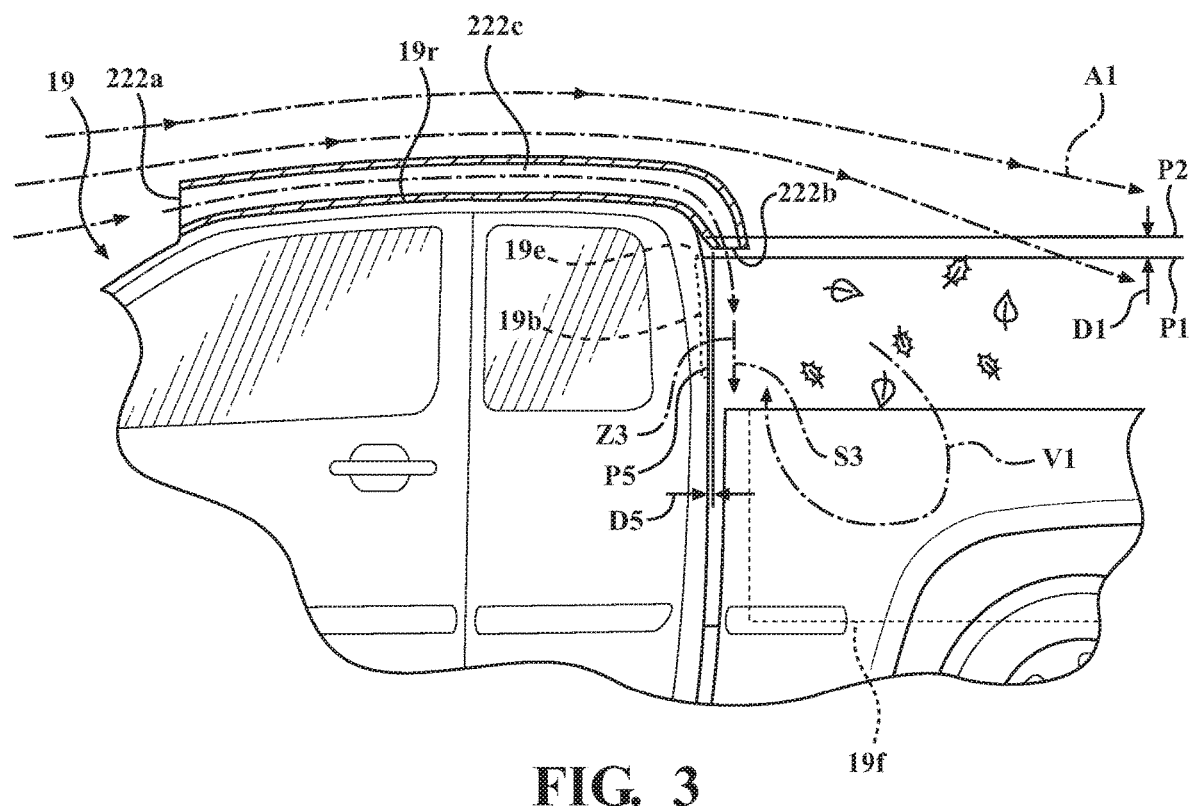
FIG. 3 is a schematic side view of a portion of a pickup truck incorporating an airflow duct in accordance with yet another embodiment described herein, structured for directing an air stream into a space behind a cab of the pickup truck.

FIG. 3 is a schematic side view of a portion of a pickup truck incorporating an airflow duct 222 in accordance with yet another embodiment described herein, structured for directing an air stream Z3 into a space behind the cab 19a of the pickup truck 19. In one or more arrangements, the airflow duct 222 may have an inlet 222a, an outlet 222b, and an airflow passage 222c extending between the inlet 222a and the outlet 222b. In the embodiment shown in FIG. 3, at least a portion of the duct 222 extends along a top portion or roof 19r of the cab. The duct 222 may be embedded in the roof structure, or the duct 222 may be formed separately from the cab 19a and attached to the roof structure 19r using any suitable attachment method.

Referring to FIG. 3, in one or more arrangements, the outlet 222b may be positioned between planes P1 and P2 as previously described with regard to FIGS. 1A and 1B. In addition, the outlet 222b may be structured so that the outlet 222b is spaced apart a distance D5 from the rear window 19b and an airstream Z3 exits the outlet 222b in a direction S3 parallel to a plane P5 of the rear window. The plane P5 may be a plane extending along a rearmost surface of the rear window 19b (i.e., a surface facing toward the cargo bed). The outlet 222b may be structured so that the direction S3 is a downward direction flowing from a duct outlet of a duct extending along the roof 19r of the cab 19a. The direction S3 may be a vertical direction. Alternatively, the outlet may be structured so that the flow direction of airstream Z3 is an upward direction flowing from an outlet of a duct extending along an underside of the cab as previously described. These arrangements act to space apart the airstream Z3 from the rear window and to provide an airstream flowing parallel to the rear window.

Figure 4:
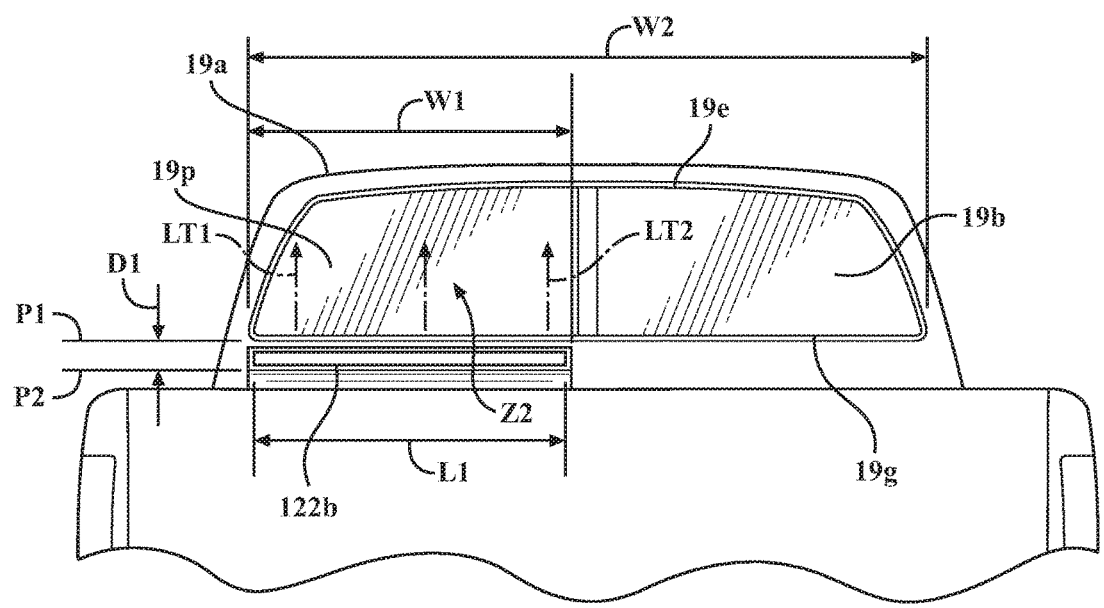
FIG. 4 is a schematic rear view of a cab of a pickup truck in accordance with an embodiment described herein, showing a relationship between a width of a rear window of the pickup truck can and a length of a duct outlet positioned adjacent the rear window.

FIG. 4 is a schematic rear view of a portion of a pickup truck in accordance with an embodiment described herein, showing a relationship between a width dimension W2 of the rear window 19b of the pickup truck and a length L1 of a duct outlet positioned adjacent the rear window. Although FIG. 4 shows the duct arrangement of FIGS. 2A and 2B and will be used to describe the window width/outlet length relationship, the same relationship between the rear window width dimension W2 and the length L1 of the duct outlet may also apply for the other duct arrangements described herein.

Referring to FIG. 4, in one or more arrangements, the outlet 122b may extend parallel to a width dimension W1 of a portion 19p of the rear window 19b structured to be openable so as to enable fluid communication between the cab interior and the space behind the cab 19a. In addition, the outlet 122b may have a length dimension L1 at least equal to the width dimension W1. This arrangement helps ensure that the air stream Z2 exiting the outlet will extend so as to prevent debris from flowing around lateral edges LT1 and LT2 of the air stream Z2 and into the open portion 10p of the rear window 19b. In one or more arrangements, the length L1 may be greater than the width dimension W1. If an entire width W2 of the rear window is openable, the outlet length dimension L1 may be at least equal to the width dimension W2.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A pickup truck comprising:
   a cab, the cab including a rear wall and a rear window positioned in the rear wall; and
   an airflow duct extending along a portion of the cab, the airflow duct having an inlet, an outlet, and an airflow passage extending between the inlet and the outlet, wherein the outlet is positioned rearwardly of the cab and within a space defined by a first horizontal plane extending through an edge of the rear window and a second horizontal plane spaced apart a predetermined distance from the first horizontal plane in a direction away from the rear window.

2. The pickup truck of claim 1 wherein the outlet is structured so that an air stream exiting the outlet is spaced apart from the rear window and exits the outlet in a direction parallel to a plane of the rear window.

3. The pickup truck of claim 1 wherein the outlet is structured so that an air stream exiting the outlet is directed rearwardly of the outlet.

4. The pickup truck of claim 3 wherein the outlet is structured so that an air stream exiting the outlet is directed upwardly of the outlet.

5. The pickup truck of claim 3 wherein the outlet is structured so that an air stream exiting the outlet is directed downwardly of the outlet.

6. The pickup truck of claim 1 wherein the outlet extends parallel to a width dimension of a portion of the rear window structured to be openable, and wherein the outlet has a length dimension at least equal to the width dimension.

7. The pickup truck of claim 1 wherein at least a portion of the airflow duct extends along a roof of the cab.

8. The pickup truck of claim 1 wherein at least a portion of the airflow duct extends along an underside of the cab.

* * * * *